United States Patent [19]

Greenberg

[11] Patent Number: 4,711,994

[45] Date of Patent: Dec. 8, 1987

[54] SECURITY SYSTEM FOR CORRELATING PASSENGERS AND THEIR BAGGAGE

[75] Inventor: Joel S. Greenberg, Princeton, N.J.

[73] Assignee: Princeton Synergetics, Inc., Princeton, N.J.

[21] Appl. No.: 819,805

[22] Filed: Jan. 17, 1986

[51] Int. Cl.$^4$ .................. G06F 15/26; G06K 19/06
[52] U.S. Cl. ................................ 235/384; 235/376; 235/375; 364/407; 364/401; 364/463; 340/825.32; 340/825.28
[58] Field of Search .............. 235/375, 376, 383, 384, 235/385, 462, 487; 364/463, 567, 401, 407; 340/568, 572, 825.31, 825.32, 825.34, 825.28, 825.29

[56] References Cited

U.S. PATENT DOCUMENTS

| | | | |
|---|---|---|---|
| 3,445,633 | 5/1969 | Ratner | 235/385 |
| 3,622,995 | 11/1971 | Dilks et al. | 364/407 |
| 3,639,728 | 2/1972 | Helfand et al. | 235/151.2 |
| 3,648,838 | 3/1972 | Hiromura | 235/487 |
| 3,752,312 | 8/1973 | Soltanoff | 209/111.7 |
| 3,805,704 | 4/1974 | Schauffler | 104/88 |
| 4,180,284 | 12/1979 | Ashley | 283/20 |
| 4,449,186 | 5/1984 | Kelly et al. | 364/407 |
| 4,514,815 | 4/1985 | Anderson | 235/385 |
| 4,634,849 | 1/1987 | Klingen | 235/487 |
| 4,647,917 | 3/1987 | Anderson et al. | 340/572 |

FOREIGN PATENT DOCUMENTS

| | | | |
|---|---|---|---|
| 59-194264 | 11/1984 | Japan | 364/407 |
| 60-146360 | 8/1985 | Japan | 364/407 |
| 60-173670 | 9/1985 | Japan | 364/407 |

OTHER PUBLICATIONS

Hawkins, Barry J., "Stan-for Aircraft Take-Off Weight and Balance", Instruments & Control Systems, 2/65, pp. 89–92.

Murakami et al., "A Load Information System for All Nippon Airways" Mitsubishi Denki Giho: vol. 55, No. 10, pp. 41–45, 1981.

Primary Examiner—Raymond F. Cardillo
Assistant Examiner—Robert A. Weinhardt
Attorney, Agent, or Firm—Lawrence P. Benjamin

[57] ABSTRACT

A method, and its associated system, for maintaining a close and accurate security surveillance of both the passengers and their baggage on a public conveyance, to insure that, before departure, baggage is not loaded aboard the conveyance without a prior, positive indication that the owner or the passenger has, in fact, been properly boarded.

12 Claims, 1 Drawing Figure

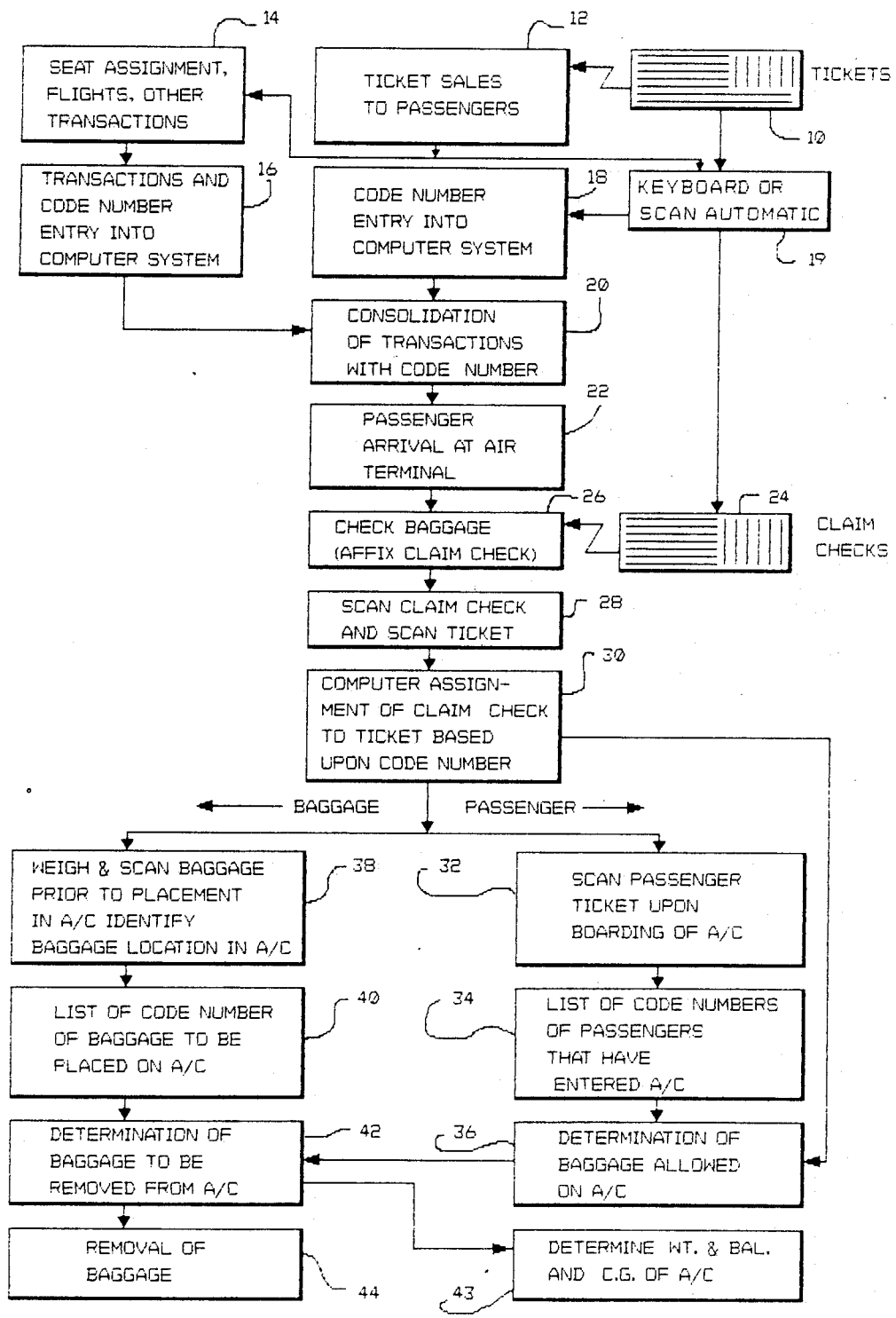

SECURITY SYSTEM FOR CORRELATING PASSENGERS AND THEIR BAGGAGE

FIELD OF THE INVENTION

This invention relates, in general, to security systems for public transports and, more particularly to a system, and an associated method, for maintaining a tight security surveillance over the passengers and their properly ticketed baggage to insure that both are, in fact, aboard the public transport.

BACKGROUND OF THE INVENTION

As the result of the recent spate of terrorist activities the operators and owners of many airlines and ocean liners have come under increased pressure, from both civil and governmental authorities, to insure that the airplanes and ocean liners will be more adequately protected from such terrorist attacks. It has, thus, become increasingly more important to devise a cost effective security system that will more effectively protect the passengers than has been heretofore possible. While present local security procedures, consisting of pre-screening passengers using metal detectors, appears to be moderately effective in discouraging passengers from carrying firearms aboard, to date, little has been done to prevent the loading of an explosive device, planted by a "no show", aboard an airplane, thereby allowing the device to be detonated in mid-air.

As used herein, the expression "baggage" shall include, but is not limited to, luggage, parcels and containers brought and checked in by a passenger, but does not include hand carried items.

A major problem now being addressed by the airlines lies in the detection of explosive material contained in baggage. While some attempts have been made toward solving this problem, all seem to have serious drawbacks that would preclude their use.

One possible solution would be to conduct a direct and/or indirect search of all checked baggage in order to identify and eliminate any baggage that contained explosive material. While this solution would be very effective in the detection and elimination of baggage containing explosive material, it is also likely to be quite costly in terms of man-hours required by airline personnel, and would probably lead to excessively long passenger waiting times. Both effects would be unacceptable to any airline.

However, a greater problem exists with the "no show" passenger who is intent on placing luggage bearing explosive aboard the aircraft as it is unlikely he will become a passenger and agree to commit suicide. A passenger may deliberately check his baggage through but never board, and thus foil present checking systems. A number of foreign airlines solve this problem by placing all checked baggage on the ramp, next to the aircraft and, as each passenger boards the aircraft, they are required to identify their baggage. Only then is the baggage loaded on the plane. This too, is an effective, but a costly and time consuming, procedure. It is just such a situation that the subject invention is designed to detect and eliminate in a cost effective and expeditious manner.

SUMMARY OF THE INVENTION

The subject security system, and an associated method of implementing the system, is directed to maintaining a close and accurate surveillance on both the baggage and passengers that board an airplane. Initially, passengers purchase tickets at an airline ticket counter, or through a travel agency, and is issued a ticket with a distinctively coded, machine readable portion imprinted thereon. Any baggage presented during check-in, will also be provided with a coded, machine readable tag or sticker which is affixed to the baggage. Both the ticket and the baggage claim check are scanned or read and the codes linked together in the memory of a computer thus identifying the passenger with specific pieces of baggage. It is only after the passenger has surrendered the ticket, and/or has boarded the aircraft that the coded portion of the ticket compared with the corresponding coded portion of the baggage tag. If the passenger is aboard, the baggage will be loaded and if earlier loaded, will remain aboard. Thus, the baggage of a "no show" will not be loaded and, if previously loaded will be identified and removed, and may, instead, be inspected.

BRIEF DESCRIPTION OF THE DRAWING

The sole FIGURE of the drawing in this case details a flow chart of one operative embodiment of my invention setting forth a method for achieving an improved, time saving and cost effective, airline security system.

DETAILED DESCRIPTION OF THE INVENTION

The following description of my novel method, together with its associated system for identifying the checked baggage of "no show" passengers, (passengers that fail to board an aircraft) carries the presumption that this is a highly suspicious situation or circumstance that should be investigated and that the baggage must not be allowed to be loaded or if previously loaded, should be removed.

Referring now to the drawing, it will be seen that with the system I propose, optimum results may be achieved in preventing the loading of the previously described undesirable baggage. The present airline procedures utilize a system whereby each ticket 10 and each claim check 24 is identified by a unique number, or if the baggage has been loaded, its easy and rapid identification and removal. I propose that tickets 10 and baggage claim checks 24 be imprinted with unique code numbers that are machine readable, in much the same manner as bank checks. They may also be provided with any one of the presently known machine readable bar codes as will be later described, in greater detail.

The expression "code number", as hereinafter used, refers to any distinctively coded, machine readable data and is meant to include any one or any combination of the following: numbers that have been printed with magnetic ink; any "bar code" system such as the vertically arranged, parallel bars, used in supermarkets to identify the various items for sale; the bars used by the Postal Service to designate the various zip codes; any concentrically arranged circles forming a "bulls eye", as well as any other coded data provided it is in a machine readable format.

The ticket and claim check code numbers will then be entered into the airline computer memory bank 18 by means of either automatically scanning the number code and/or bar code, or by a manual, direct keyboard entry 19. Tickets 10 will then be distributed to airline ticket agents or travel agencies 12, and the claim checks 24 distributed to baggage handlers in the same manner currently practiced. The information so derived may be used to indicate the airline ticket agent or the travel agency 12, as well as the baggage handler, to whom the ticket was assigned.

Tickets are frequently sold and issued 12 to passengers at the ticket counter, by an agent of the airline, or at a travel agency that has a computer terminal and the authority to access the airline computer. In the normal course of events, the reservation will be confirmed and a boarding pass with a seat assignment will be issued. According to my novel system, now, the ticket code number is scanned again and loaded into the computer memory 18, together with any other pertinent information (passenger name, address, credit card or other billing information, etc). This latter entry may also be done by any of the many automatic scanning devices currently in use, or in the absence of an automatic scanner, the ticket code number may be entered manually 19, via the terminal keyboard. Thus, every ticketed passenger now has a uniquely different, identifying number. This procedure neither infers delays nor inconveniences the passenger and is entirely compatible with the vast majority of tickets that are currently being sold and processed.

For those passengers holding tickets that were issued at a travel agency that has no computer terminal or other access to the airline computer, my check-in procedure requires that the passenger report to the airline ticket counter, or to the check-in counter at the boarding area, in order to confirm his reservation and obtain a seat assignment and boarding pass. This gives the airline the opportunity to capture the necessary ticket code number and enter it into their computer memory 14,16. Should there be any changes in any of the seating assignments, flight plans etc., or if any other transaction is made, each such change or alteration will be entered 14, accompanied by the unique ticket code number now used for identification. Thus, with the information now stored in the computer memory, it is a simple task for the computer to to then consolidate all of the transactions since they are all keyed to the unique passenger ticket code number identification.

The next step in my novel procedure addresses the handling of baggage during the check-in process upon the arrival of the passenger at the airline terminal building 22. Normally, baggage is processed either at curb-side or at the ticket counter. In either event, a baggage claim check 24, consisting of a tag portion and a receipt portion, with both portions also bearing a unique claim check code number, similar in type to that used on the ticket. Customarily, when baggage is presented for check-in at curb-side, the tag portion is affixed 26 to the baggage and the receipt portion is either given to the passenger if a ticket is to be purchased at the counter or, if the passenger has a ticket, it is affixed to airline ticket 10.

At this point, various check-in scenarios are possible. For example, if the passenger possesses a ticket 10, indicating a confirmed reservation, and has a previously issued boarding pass with a seat assignment then, during baggage check-in, the code numbers on the ticket, the boarding pass and any checked baggage receipt are scanned 28 at the curb-side check-in station, to enter the ticket and baggage code number information into the computer memory, after which, the passenger proceeds to the boarding area.

In another situation, the passenger arrives at terminal 22 with baggage for check-in at the curb-side station with a ticket but with no boarding pass and no seat assignment. In this event, the baggage is checked in and the tag portion of the baggage claim check 24 is affixed to the baggage 26. The code number portions of both baggage claim check 24 and ticket 10 are then scanned 28 for entry into the computer memory. The passenger is then required to check in at the ticket counter to confirm his reservation and get a boarding pass and seat assignment 14. At this time, the agent has an opportunity to re-scan 16 the code number portions of ticket 10, baggage claim check 24 and the boarding pass 14, either to enter, or to confirm, that the data is in the airline computer system. The passenger may now proceed to the boarding area. Alternatively, the passenger may go directly to the boarding area to obtain his boarding pass and seat assignment. In this event, after a boarding pass 14 is issued, all of the code number information is re-scanned 28 and entry into the computer memory confirmed, just as it would have been had the passenger gone to the ticket counter instead.

Yet another check-in situation arises where a passenger arrives 22 to check baggage 26 at the curb-side station without a ticket, intending to purchase, or pick up a ticket ordered earlier over the telephone. The passenger may opt to have the baggage checked and get a code numbered claim check that will be scanned 28 at curb-side, or forego the curb-side check-in and transport the baggage to the ticket counter where the ticket is either issued, or picked up. The ticket agent will also issue a boarding pass with seat assignment 14, and a claim check 24 and, in not done earlier, will issue a code numbered claim check and affix the tag portion 26 to the baggage. The agent now has the opportunity to scan and capture 16,18, or re-scan and confirm that all of the necessary passenger, baggage and seating information, is in the computer memory 20. The passenger may now go to the boarding area.

At this point in time, the passengers and baggage go their respective ways to the aircraft. Upon entry of the passenger and baggage information, the computer correlates the information received to match and assign the various pieces of baggage to each passenger (30) as well as perform other desirable functions.

The passengers, when boarding the aircraft, are required to surrender the ticket 10 (if they had not been asked to do so earlier), and the code number portion of ticket 10 is again scanned 32. The ticket code number information so derived is then sent to the airline computer memory where the computer generates a list of passengers 34 that are aboard the aircraft. The baggage tag code number portions of the checked baggage are also weighed and scanned 38 in order to generate a list of the baggage that may be allowed aboard the aircraft. This latter step is done by matching the baggage claim check code numbers, entered into the system memory during check-in, with the list of boarded passengers.

While the foregoing description of the operation of my novel security system has been presented in terms of scanning code numbered tickets and baggage claim checks, it should now become obvious from a reading of this exegesis, that alterations may be made to my system, without departing from the inventive concept.

For example, one embodiment would utilize the addition of code numbers imprinted on the boarding pass-/seat assignment care to accommodate some airlines. In certain instances, an airline may require that the passenger surrender his code numbered ticket at the boarding area, prior to actually boarding the aircraft. The passenger then proceeds, on his own and unattended, to board the aircraft by traversing either down an elevated boarding ramp or across the tarmac to the aircraft. In either event, the terrorist is provided with an avenue of escape. If this be the case, the boarding pass/seating assignment 14 card is provided with a detachable, code number portion, that may be similarly coded and read as are the ticket 10 and claim check 24. The code numbered, detachable portion is then collected by an attendant at the time the passenger physically arrives at the aircraft, and is boarded. The code numbers are then scanned and the passenger list generated for use as previously described.

Thus, all possible scenarios by which terrorist "no shows" may have previously been able to get undesirable baggage aboard an aircraft have been prevented since, if any claim check code number information is present in the system, without corresponding ticket and/or boarding pass/seating code number information, the system will quickly indicate that the information is missing. The code numbered claim check list will then be used to identify the offending baggage 42, which will then be removed if loaded 44, or separated if not loaded, to await possible identification by a later entered code for a passenger that may have been on standby status. After all properly identified baggage is loaded, any remaining baggage is removed entirely if no further valid identification or explanation is forthcoming.

Other advantages are achieved by using my novel security system. For example, two lists are generated; the first is a list of the passengers aboard the aircraft, arranged by seat assignment and the second is a list of the loaded baggage, identified by passenger. Such lists will serve to keep track of passenger and baggage destinations, within the system, and as a check for the baggage loaders and minimize losing or misplacing baggage. It could also provide a means for quickly finding any lost or misplaced baggage.

An additional advantage may be derived by weighing the baggage (38), while reading the claim check code number, and programming the computer to perform the required Weight and Balance calculation 43 to assure the pilot (and the airline), that the Center of Gravity (C.G.) of the aircraft, when loaded with fuel, passengers, baggage and cargo, is maintained within the Weight-C.G. envelope design parameters, and that the Weight and Balance calculations have, in fact, been made and are met.

While the above-described security system has been set forth in terms of aircraft passenger and baggage surveillance, I do not wish to be so limited. It will now be obvious that my system has equal applicability for the security maintenance of bus lines and seagoing vessels, as well as any other means of transporting the public.

What I claim is:

1. A security system for maintaining a close surveillance over both passengers and their baggage to be loaded aboard a public conveyance, comprising:
   a passenger ticket having a uniquely distinctive, machine readable code number printed thereon, for issuance to an airline ticket agent or travel agency;
   a baggage claim check having a tag portion and a receipt portion, both portions having a uniquely distinctive, similarly machine readable code number printed thereon, for issuance to baggage handlers;
   means for initially recording and storing the ticket and claim check code numbers, to indicate the airline ticket agent or travel agency to whom the ticket was issued and to indicate the baggage handler to whom the claim check was issued;
   means for recording and storing the code number printed on the ticket, when the ticket is issued to a passenger;
   means for recording and storing the code number printed on the claim check, when the tag portion thereof is affixed to baggage, at the time the passenger presents baggage to be checked in;
   means for re-recording and re-storing the passenger ticket code number, at the time the passenger presents the baggage to be checked in, to identify and associate each passenger with specifically identified baggage;
   means for again recording and storing the ticket code number, as the passenger boards the conveyance, to identify and confirm the presence of each passenger aboard the conveyance;
   a first list of passengers who have boarded the conveyance generated by the storage means;
   a second list of identified baggage associated with a specific boarded passenger generated by the storage means; and
   the second list indicating which of the baggage is or is not allowed to be loaded aboard the conveyance.

2. The surveillance system of claim 1, wherein the means for recording and storing the passenger ticket and claim check number codes comprises:
   a computer system having the passenger ticket and claim check code numbers information stored therein; and
   the computer system generating the first and the second lists.

3. The surveillance system if claim 2, further comprising:
   a boarding pass/seat assignment card having a detachable portion bearing a uniquely distinctive, similarly machine readable code number printed thereon, for issuance to the passenger by the ticket agent or travel agency at a time prior to boarding, as a requirement for boarding; and
   means for recording and storing the card code number, when the passenger presents the card to board the conveyance.

4. The surveillance system of claim 3, wherein:
   the printed code numbers information, associated with each passenger, are automatically scanned for entry and storage in the computer system memory, as each such code number is issued.

5. The surveillance system of claim 3, wherein:
   the printed code numbers information, associated with each passenger, are manually entered and stored in the computer system, as each such code number is issued.

6. The surveillance system of claim 2, wherein:
   the public conveyance is an aircraft;
   the baggage is weighed as the tag portion of the claim check code number is entered; and
   the computer system performs a Weight and Balance computation to determine that, when loaded with passengers and baggage, the Center of Gravity of the aircraft is maintained within the Weight/Center of Gravity envelope design parameters of the aircraft.

7. A method of operating a security system for maintaining a close surveillance over both passengers and their baggage to be loaded aboard a public conveyance, comprising the steps of:

printing a uniquely distinctive, machine readable code number on a passenger ticket for issuance to an airline ticket agent or travel agency;

printing a uniquely distinctive, similarly machine readable code number on a claim check, the claim check having a tag portion and a receipt portion, both portions having the code number printed thereon, for issuance to baggage handlers;

initially recording and storing the ticket and claim check code numbers in a recording and storing device, to indicate the airline ticket agent or travel agency to whom the ticket was issued and to indicate the baggage handler to whom the claim check was issued;

recording and storing the code number printed on the ticket in the storing device, when the ticket is issued to a passenger;

recording and storing the code number printed on the claim check in the recording and storing device, when the tag portion thereof is affixed to baggage, at the time the passenger presents baggage to be checked in;

re-recording and re-storing the passenger ticket code number, at the time the time the passenger presents the baggage to be checked in, to identify and associate each passenger with specifically identified baggage;

recording and storing the ticket code number again, as the passenger boards the conveyance, to identify and confirm the presence of each passenger aboard the conveyance;

generating a first list of passengers who have boarded the conveyance, the first list generated by the storage device;

generating a second list of identified baggage associated with a specific boarded passenger, the second list generated by the storage means; and indicating on the second list which of the baggage is or is not allowed to be loaded aboard the conveyance.

8. In the method of operating the surveillance system of claim 7, wherein the steps of recording and storing the passenger ticket and claim check number codes comprises the steps of:

entering the passenger ticket and claim check code numbers information into a computer device for storage therein; and generating the first and the second lists in the computer system.

9. In the method of operating the surveillance system of claim 8, comprising the further steps of:

printing a uniquely distinctive, similarly machine readable code number on a boarding pass/seat assignment card, the card having a detachable portion with the code printed thereon, for issuance to the passenger by the ticket agent or travel agency at a time prior to boarding, as a requirement for boarding; and recording and storing the card code number in the computer device, when the passenger presents the card to board the conveyance.

10. The method of operating the surveillance system of claim 9, wherein the step of recording and storing comprises:

scanning the printed code numbers information associated with each passenger automatically; and entering and storing the scanned code number in the memory of a computer device, as each such code number is issued.

11. The method of operating the surveillance system of claim 9, wherein the step of recording and storing the code numbers comprises:

entering the code numbers information associated with each passenger manually, for storage in the memory of the computer device, as each such code number is issued.

12. The method of operating the surveillance system of claim 8, wherein the public conveyance is an aircraft, comprising the further steps of:

weighing the baggage as the code number on the tag portion of the claim check is being recorded;

storing the weight information in the memory of the computer device; and performing a Weight and Balance computation in the computer device using the weight stored information to determine that, when loaded with passengers and baggage, the Center of Gravity of the aircraft is maintained within the Weight-Center of Gravity envelope design parameters of the aircraft.

* * * * *